United States Patent [19]

Capizzi et al.

[11] Patent Number: 4,621,342
[45] Date of Patent: Nov. 4, 1986

[54] ARBITRATION CIRCUITRY FOR DECIDING ACCESS REQUESTS FROM A MULTIPLICITY OF COMPONENTS

[75] Inventors: Giuseppe N. Capizzi, Brandizzo; Marcello Melgara, Valenza, both of Italy

[73] Assignee: CSELT Centro Studi E Laboratori Telecomunicazioni S.p.A., Turin, Italy

[21] Appl. No.: 575,837

[22] Filed: Feb. 1, 1984

[30] Foreign Application Priority Data

Feb. 3, 1983 [IT] Italy ............................. 67111 A/82

[51] Int. Cl.$^4$ ............................................. G06F 9/46
[52] U.S. Cl. ............................................. 364/900
[58] Field of Search ... 364/200 MS File, 900 MS File

[56] References Cited

U.S. PATENT DOCUMENTS

| | | | |
|---|---|---|---|
| 4,009,470 | 2/1977 | Danilenko et al. | 364/200 |
| 4,121,285 | 10/1978 | Chen | 364/200 |
| 4,375,639 | 3/1983 | Johnson | 364/200 |
| 4,482,950 | 11/1984 | Dshkhuniann | 364/200 |
| 4,511,959 | 4/1985 | Nicolas et al. | 364/200 |

*Primary Examiner*—David Y. Eng
*Attorney, Agent, or Firm*—Karl F. Ross; Herbert Dubno

[57] ABSTRACT

A circuit arrangement for deciding concurrent requests for access to a common data bus emitted by a number $n = 2^m$ of components of different ranks, specifically multiprocessor elements, comprises n mutually identical arbitration devices respectively associated with these components. The arbitration devices are interconnected in a chain by a priority bus of branched binary structure divided into m lines connected, within each device, to a logic network that is also connected to an internal m-conductor bus extending from a priority-code register. The priority bus, whose lines are normally at zero potential, is connected in any given device to the register thereof in the presence of an access request from the associated component whereupon its logic network determines whether the code on that bus equals the contents of the register; if so, the associated component is enabled by a control unit of the device to access the data bus. If, however, a simultaneous access request from a higher-ranking component causes another arbitration device to energize the priority bus, the code emitted by that other device overrides that of the first-mentioned device whose logic network therefore detects an inequality. A cascaded connection of the control units of the several arbitration devices enables a decrementer in each device to establish priority codes of progressively lower rank along the cascade in an initialization phase; the logic network also modifies, at the beginning of each operating cycle except during prolonged seizure of the data bus by any component, the priority code initially assigned to each arbitration device in order to give precedence to nominally lower-ranking components.

11 Claims, 5 Drawing Figures

ARBITRATION CIRCUITRY FOR DECIDING ACCESS REQUESTS FROM A MULTIPLICITY OF COMPONENTS

FIELD OF THE INVENTION

Our present invention relates to a data-handling system in which a multiplicity of components, such as elements of a multiprocessor, are served by a common data bus which can be alternatively accessed by them.

BACKGROUND OF THE INVENTION

In order to decide among several concurrent access requests from different components, arbitration circuitry is needed which must determine the relative ranks of the requesting components and enable the highest-ranking one to seize the data bus for one or more operating cycles. In a complex system having a large number of such components served by the same bus, the decision-making procedure is advantageously distributed among a multiplicity of arbitration devices which are individually associated with these components and can operate rapidly on the basis of certain criteria. Not infrequently, access requests must be responded to in a time interval of 125 ns or less in keeping with corresponding operating cycles of the data bus. Such a distribution scheme is also advantageous, as compared with a centralized structure, in that it facilitates reconfiguration in the event of failure of one or more components.

In many instances, moreover, the relative rankings of the components involved are not fixed but can be varied in order to improve the access possibilities of components which otherwise would be at the bottom of a rigid order of precedence. Such modifications, again, should be carried out rapidly during a fraction of an operating cycle of the associated data bus.

OBJECTS OF THE INVENTION

An important object of our present invention is to provide improved arbitration circuitry of the decentralized type, satisfying the need for quick response to incoming access requests and requiring no intervention of external units in their decision-making process.

Another object is to provide such circuitry with a minimum of hard-wired connections among the several arbitration devices.

A further object is to provide means in each arbitration device for enabling its loading, during an initialization phase, with an assigned priority code subject to rapid modifications during subsequent operating cycles.

It is also an object of our invention to provide these arbitration devices with integrated logic networks of minimum propagation delay.

SUMMARY OF THE INVENTION

A circuit arrangement according to our invention, forming part of a data-handling system with a multiplicity of $n = 2^m$ components of different ranks served by a common data bus as discussed above, comprises a chain of mutually identical arbitration devices which are respectively associated with and individually connected to the components whose access requests are to be decided upon, these arbitration devices being interlinked by a priority bus with m lines having a branched structure of binary configuration (i.e. a binary-tree structure) including a first line connected to all n devices and an $m^{th}$ line divided into n/2 sections each connected to a pair of adjacent devices. These devices follow one another in a predetermined ranking order of the associated components and include register means for storing an m-bit priority code initially assigned to each device; the codes initially assigned to consecutive devices have numerical values varying progressively in conformity with the ranking order of the associated components. Each device further comprises normally blocked gating means, inserted between the priority bus and an output circuit of its register means, for transmitting the stored code to the priority bus in the presence of an access request from the associated component as detected by a control unit included in the device. The priority bus and the output circuit of the register means are connected in each device to comparison means for detecting an equality between the transmitted code and the state of energization of the lines of the priority bus in the presence of such an access request; this state of energization is modified by an overriding priority code simultaneously transmitted to the priority bus from a device associated with a higher-ranking component. The control unit, upon unblocking the gating means, awaits an equality determination by the comparison means before sending a consent signal to the associated component in order to enable same to access the data bus, the absence of such an equality determination indicating that the bus has been seized upon command of an arbitration circuit with a higher priority code.

Usually, and in accordance with the preferred embodiment described hereinafter, the lines of the priority bus will be wires which are normally at zero potential (ground) and are energized with a certain voltage when the bits to be conveyed by them have the logic value "1". Thus, the transmission by a given arbitration device of a "1" bit to any such wire will override a homologous "0" bit applied to the same wire by any other device connected thereto. A similar overriding effect could be had with lines constituted by optical fibers energized—i.e. illuminated—to convey a "1" bit.

In accordance with a more particular feature of our invention, each arbitration device further comprises calculating means inserted in series with a normally inactive driver in a loop between the output circuit and an input circuit of the corresponding register means in order to reload same upon activation of the driver by a command from the control unit. If the reloading has only the purpose of refreshing the initially stored code, the calculating means may have reference inputs connected to a local ground, for example. In accordance with another important aspect of our invention, however, the reloading serves for a periodic modification of the initially assigned code in which case the reference inputs of the calculating means are to be connected to the lines of the priority bus.

In order to carry out such periodic modification, a logic network forming the calculating means receives from the priority bus an m-bit reference code whose bits—representing the state of energization of respective lines—are generically designated $p_j$ (with j ranging from 1 through m) and also receives corresponding bits $r_j$ of the stored code for deriving therefrom respective bits $d_j$ of a new code according to the following Boolean equations:

$$d_j = p_j \text{XOR} r_j \tag{1}$$

$$d_j = [\overline{d_{j+1}} \cdot p_j] \text{XOR} r_j \tag{2}$$

where * stands for the logical AND function while XOR represents the Exclusive-OR function.

Equation (1) applies to the most significant bit, with j–m, while equation (2) is used for all other bits. Actually, however, equation (1) is merely a special case of equation (2) based on the obvious premise that $p_{m+1} = r_{m+1} d_{m+1} = 0$ so that $\overline{d_{m+1}} = 1$.

With such an arrangement, the stored code remains unchanged if the bus is de-energized, i.e. if $p_j = 0$ for all values of j, but will be altered when a selective pattern of energization appears on that bus. In particular, the presence of voltage on the through-going first line of that bus during each reloading phase—e.g. at the beginning of each operating cycle—will alternately change and restore the initially assigned priority code during consecutive cycles.

The calculating and comparison means of each arbitration device may be combined into a single logic network which can be incorporated in an integrated module and is preferably divided into two cascaded stages each making a partial comparison between corresponding bits $p_j$ and $r_j$, with the second stage also taking bits $d_j$ from the first stage into account. Such a subdivision, especially with higher values of m (e.g. m=5), significantly accelerates the computation of the new code.

With the priority bus de-energized in the initialization phase, and with the control units of the several arbitration devices connected in cascade, the initially assigned priority codes can be established automatically within each device with the aid of arithmetic means—specifically a decrementer—inserted between the priority bus and the associated register means. Closure of a normally open switch in the first device of the chain, by a command from its control unit, converts the all-0 starting code on the bus into an all-1 priority code to be stored in that device and to be thereafter transmitted—via the aforementioned gating means—to the same bus to serve as a starting code for the next-following arbitration device, and so on to the end of the chain. This initial loading of the various internal registers takes, of course, substantially longer than the periodic modification and restoration of the assigned codes as described above.

Pursuant to yet another feature of our invention, applicable to a system in which a component served by the data bus is to be able to access that bus for more than one operating or clock cycle, any component desiring such an extended access time emits a prolongation signal to the associated arbitration device which thereupon generates a lockout or inhibition signal, received by the control units of all these devices, in order to prevent a reloading of their code-storing registers through, preferably, the penultimate cycle of seizure of the data bus by the component emitting the prolongation signal. When that seizure is terminated, any request incoming in the immediately following cycle will be evaluated in light of the code modifications that have occurred in the last cycle of seizure.

BRIEF DESCRIPTION OF THE DRAWING

The above and other features of our invention will not be described in detail with reference to the accompanying drawing in which.

SPECIFIC DESCRIPTION

Figure 1:
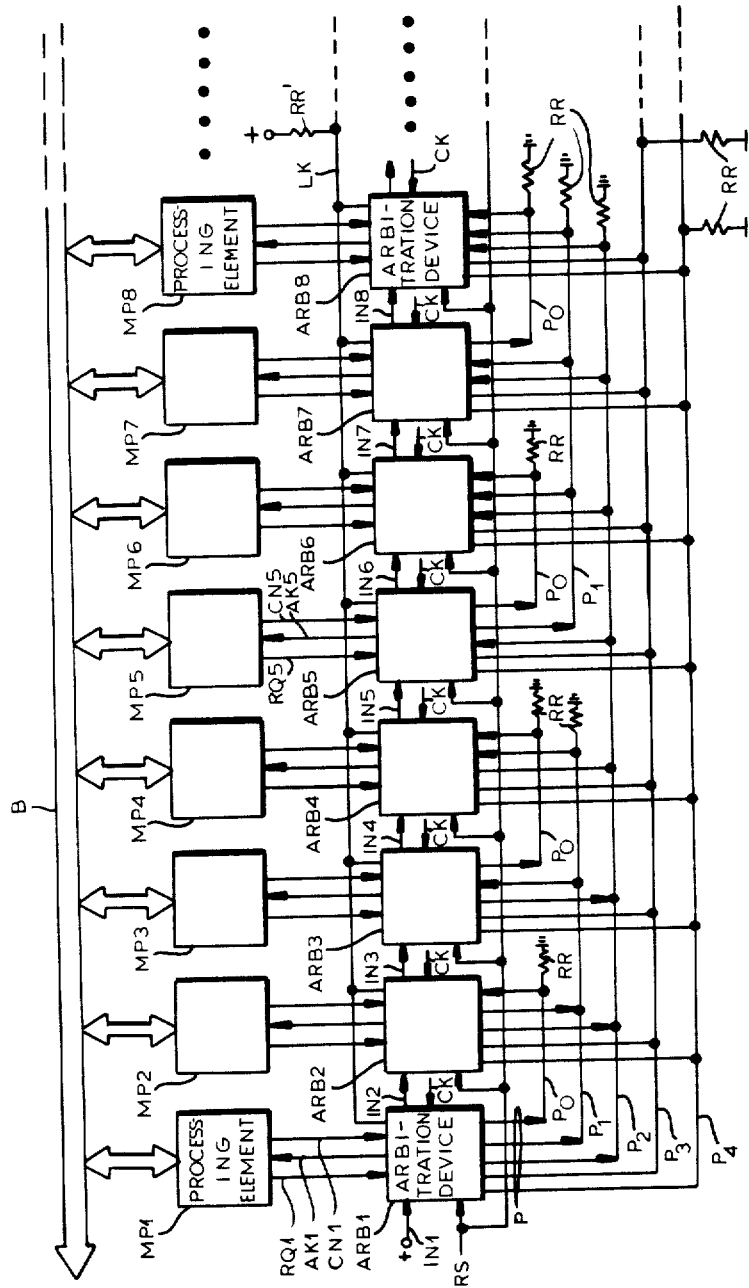
FIG. 1 is a block diagram of a circuit arrangement according to this invention, including a chain of arbitration devices associated with respective processing elements served by a common data bus.

In FIG. 1 we have shown the first eight of a set of 32 processing elements or circuit components MP1–MP8 served by a common data bus B which is alternatively accessible by these elements. The latter communicate with respective arbitration devices ABR1–ARB8 which are part of a chain of 32 such devices, all mutually identical, and are designed to decide on the order in which concurrently emitted requests by two or more of the associated components MP1 etc. for access to bus B are to be granted.

The 32 arbitration devices ARB1 etc. are interlinked by a priority bus P composed of five lines $P_0$–$P_4$ forming a branched binary structure. Line $P_4$, designed to carry the most-significant bit of a 5-bit code word, is a single wire connected to all 32 arbitration devices. Line $P_3$ consists of two wires (only one shown) each connected to 16 of these devices. Line $P_2$ is divided into four wires (again only one shown) connected to eight devices apiece. Two of eight wires forming line $P_1$ are shown connected to devices ARB1–ARB4 and ARB5–ARB8, respectively. Of 16 wires constituting line $P_0$, designed to carry the least-significant bit of a code word, four are shown connected to pairs ARB1/ARB2, ARB3/ARB4, ARB5/ARB6 and ARB7/ARB8 of consecutive devices. Each wire is grounded through an individual resistor RR.

Also shown in FIG. 1 are a lead serving to deliver a resetting signal RS to all arbitration devices at the beginning of an initialization phase; these devices further have parallel inputs carrying clock pulses CK from a nonillustrated time base. A lockout lead LK, also connected in parallel to all these devices, is connected to positive potential through a resistor RR'; lead LK can be grounded by any arbitration device, under circumstances and for purposes described hereinafter.

Device ARB1 has another input lead IN1 seen to be connected to positive potential. Corresponding input leads IN2–IN8 of the other illustrated devices are energizable by the devices respectively preceding them in the chain. Each device dialogues with the associated processing element MP1–MP8 via a two-way connection including incoming leads, carrying request signals RQ1–RQ8 and prolongation signals CN1–CN8, and an outgoing lead carrying a consent signal AK1–AK8. The 24 nonillustrated arbitration units and associated processing elements are, of course, similarly interconnected.

Figure 2:
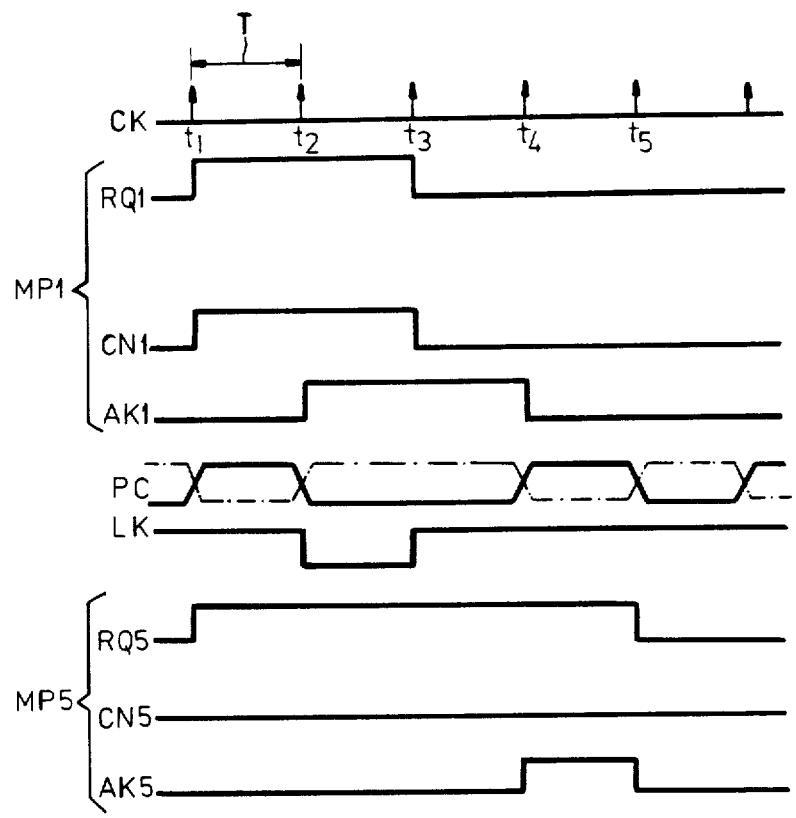
FIG. 2 is a set of graphs pertaining to the operation of certain arbitration devices in response to requests for data-bus access by the associated elements.

The graphs of FIG. 2 show clock pulses CK, request, consent and prolongation signals RQ1, AK1, CN1 and RQ5, AK5, CN5 respectively pertaining to components MP1, MP5 and device ARB1, ARB5, the voltage on lead LK, and variations in priority codes PC of two groups of devices, all for a number of clock cycles during which it is assumed that components MP1 and MP5 compete for access to data bus B of FIG. 1. Clock pulses CK occur at instants $t_1$, $t_2$ etc. marking the beginning of consecutive operating cycles of duration T, in the first of which the components MP1 and MP5 both emit their respective request signals RQ1 and RQ5. Signal RQ1 is accompanied by a prolongation signal CN1 indicating to device ARB1 that component MP1 desires to access the bus B for more than one clock cycle T.

Under the modalities described hereinafter, by which each arbitration device is loaded with an initially assigned priority code subject to periodic modifications, device ARB1 is assumed to contain a priority code outranking that of device ARB5 at least in the cycle $t_1$-$t_2$ during which the two request signals are generated. Device ARB1, therefore, is allowed to send out its consent signal AK1 in response to request RQ1 while request RQ5 is being put on hold. The emission of signal AK1 occurs in the following clock cycle $t_2$-$t_3$ and is accompanied by a grounding of lead LK (FIG. 1) as likewise indicated in FIG. 2. With prolongation signal CN1 terminating at the end of this latter cycle, the grounding of lead LK ends also at instant $t_3$ whereas signal AK1 is maintained for one additional cycle, i.e. to instant $t_4$. With request signal RQ1 canceled at that instant, and in the assumption that no other arbitration device with an overriding priority code has intervened, device ARB5 is able to honor the request RQ5 by emitting the consent sginal AK5 in the next cycle $t_4$-$t_5$. As component MP5 has not requested a prolonged access, signal AK5 lasts only for this one cycle without any grounding of lead LK.

As indicated in graph PC of FIG. 2, the priority codes of one group of devices (solid line) are upgraded while those of another group (phanton line) are downgraded at instants $t_1$ and $t_4$, for example, whereas the reverse modification occurs $t_2$ and $t_5$. No such code modification takes place at instant $t_3$ while lead LK is grounded.

Figure 3:
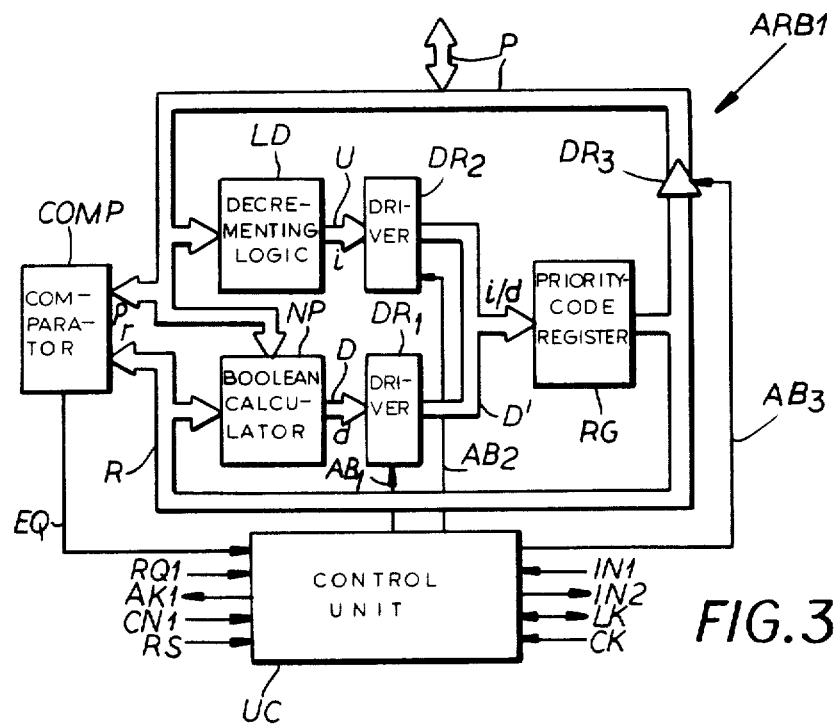
FIG. 3 shows details of the first arbitration device in the chain.

The structure of device ARB1, which is representative of all 32 arbitration devices, is illustrated in FIG. 3. The device includes a five-wire extension of priority bus P as well as an internal bus R, also of five wires. Buses P and R are connected to respective inputs of a comparator COMP and, in parallel therewith, to a Boolean calculator NP having a five-wire output bus D connected through a normally inactive driver $DR_1$ to an input circuit of an extension bus D' terminating at a priority-code register RG. Internal bus R constitutes the output circuit of register RG and is further connected, via a driver $DR_3$ constituting a normally closed transmission gate, to priority bus B. The latter further extends to a decrementing logic LD with a five-wire output bus U connected to bus D' through a driver $DR_2$ acting as a normally open switch. Buses P, R, D and U respectively carry a starting or reference code p, a stored priority code r, a new or modified code d and an initially assigned code i, each in the form of a 5-bit word.

A control unit UC individual to device ARB1 receives clock pulses CK, positive voltage IN1 on the input lead so designated in FIG. 1, request signal RQ1 and prolongation signal CN1 from the associated component MP1, a resetting signal RS on the correspondingly designated lead of FIG. 1, and an output signal EQ from comparator COMP in the event of identity of the code words p and r on buses P and R. Unit UC emits the consent signal AK1 to component MP1, an initiation signal IN2 to the control unit of device ARB2 on the lead correspondingly designated in FIG. 1, and activating commands $AB_1$, $AB_2$, $AB_3$ to drivers $DR_1$, $DR_2$, $DR_3$, respectively. Unit UC, like all other control units, further emits or receives an inhibition signal LK on the correspondingly designated lockout lead of FIG. 1 which can be grounded by this and any other control unit as described above with reference to FIG. 2.

Block NP implements the above-discussed Boolean equations (1) and (2) in order to convert the stored code r, written in register RG, into a new code d whenever a reference code other than the normal all-0 word appears on bus P; this occurs, as described above, at the beginning of each clock cycle but has no effect upon the contents of register RG unless driver $DR_1$ is activated at that time. Such activation, i.e. the emission of a command $AB_1$ by unit UC, is omitted at all arbitration devices when lead LK is grounded by any of their control units.

Decrementer LD, which advantageously is implemented by PLA logic (for programmed logic array) rather than by more slowly operating pulse counters, subtracts a "1" from the bit combination present on bus P. At the beginning of a program, following the generation of resetting signal RS, all wires of bus P are grounded so that an all-0 -word initially appears thereon as a starting code. Decrementer LD of device ARB1 converts this word into an all-1 initial priority code i which is stored in register RG upon closure of electronic switch $DR_2$ at the beginning of an initialization phase. The subsequent activation of driver $DR_3$, i.e. the opening of the transmission gate between buses R and P, delivers this all-1 word to bus P as a starting code for device ARB2 whose incrementer thereupon converts it into a code 11110 initially assigned to that device. In like manner, all other devices of the chain starting with device ARB1 initially receive assigned priority codes of progressively diminishing numerical values, with an all-0 code assigned to the $32^{nd}$ device. In principle, a similar result could be achieved by designing the arithmetic stage LD as an incrementer rather than as a decrementer; this, however, would require an initial energization of all wires of bus P in order that the all-0 code be assigned to the lowest-ranking device (in that case ARB1) in the initial order of precedence.

As will be apparent, drivers $DR_1$ of any device must never operate concurrently with a driver $DR_3$ of any other device in order to prevent an irreversible falsification of the assigned or modified priority code.

Figure 4:
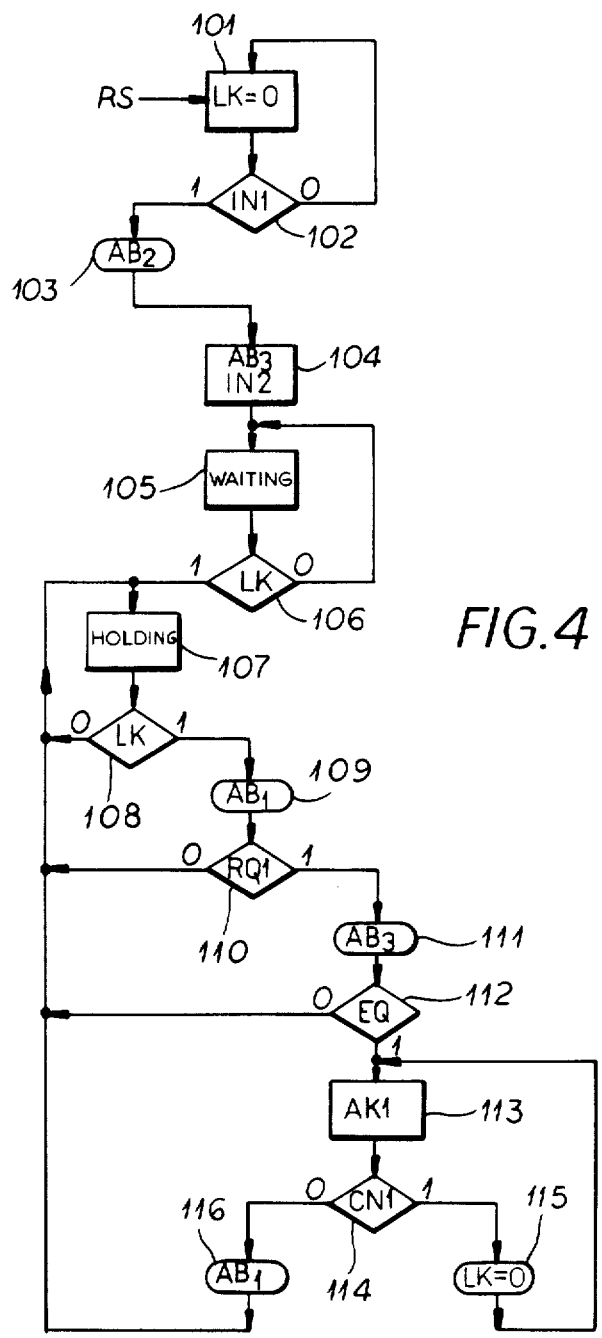
FIG. 4 is a flow chart relating to the program of a control unit shown in FIG. 3.

The operating program of control unit UC of FIG. 3 is represented by the flow chart of FIG. 4 which shows an initial state 101 established by the resetting signal RS. In this state, during which the lockout conductor is grounded as indicated by the inhibition signal LK=0, the unit determines in an inquiry 102 whether the corresponding initiation signal IN1=1 to mark the beginning of an initialization phase. When this happens, command $AB_2$ is emitted in a step 103 to load the register RG of FIG. 3 with the priority code (11111) assigned to device ARB1 as described above. Next, in a state 104, unit UC emits the command $AB_3$ together with signal IN2 whereby bus P is energized with code 11111 for the loading of the register of device ARB2 with the decremented code 11110. Unit UC of device ARB1 thereupon removes ground from lead LK which, however, is grounded at that time by the corresponding unit of device ARB2. The same applies to the subsequent devices whereby the grounding of lead LK persists until the $32^{nd}$ device has stored its assigned code 00000 in its internal register.

Unit UC, in a waiting state 105, tests the lockout lead in every cycle to detect the disappearance of the inhibition signal. When this test—represented by an inquiry 106—determines that LK=1, the initialization phase is concluded and control unit UC (along with the corresponding units of all other arbitration devices) passes to a holding state 107 in which it tests once more the signal level on lead LK as indicated by an inquiry 108. Upon finding that LK=1, unit UC leaves the state 107 and in a step 109 emits the command $AB_1$ activating the driver $DR_1$ (FIG. 3) in order to let block NP enter the newly calculated code d in register RG. There follows an inquiry 110, within the same operating cycle, to determine whether or not a request signal RQ1 from component MP1 is present on the corresponding lead. If not, the unit returns to holding state 107 and repeats the afore-described reloading procedure in each cycle in which LK=1.

If inquiry 110 has an affirmative result, unit UC—still in the same cycle—generates in a step 111 the command $AB_3$ which unblocks the transmission gate $DR_3$ to transfer the code stored in register RG to priority bus P. If that bus does not carry an overriding code at that time, identical 5-bit words will appear at the inputs of comparator COMP which therefore emits the equality signal EQ detected by unit UC in an inquiry 112. Thus, a negative outcome of that inquiry restores the holding state 107 whereas an affirmative outcome results in the emission of consent signal AK1 in the next cycle as represented by a state 113. At this point, furthermore, the unit determines in an inquiry 114 whether prolongation signal CN1 is also present. If so, it grounds the lead LK (LK=0) as indicated by a step 115, thereupon returning to state 113. Whenever inquiry 114 yields CN1=0, command $AB_1$ is emitted in a step 116 so as to reload the internal register RG as unit UC returns to state 107.

The flow chart of FIG. 4 applies, of course, to all other control units with replacement of signals IN1, IN2, RQ1, AK1 and CN1 by their corresponding counterparts.

Let us now consider, by way of example, the effect of a reference code other than starting code 00000 upon the operation of calculator NP and the resulting modified priority code d. With r=11111, as assumed above for device ARB1, the presence of a reference code p=10000 will result in a new code d=01111. A reappearance of code 10000 at the beginning of the next cycle in which LK=1 will restore the original code r=11111. In similar manner, a priority code 01111 initially assigned to the $17^{th}$ arbitration device will be converted to d=11111 and will thereafter return to its original form, as indicated in graph PC of FIG. 2. Since the last four bits of any priority code will remain unaltered, the two groups represented by the first and the last 16 devices of the chain will have their order of precedence transposed without any change in the relative priorities within each group. The aforementioned reference code can be simply generated by a brief energization of wire $P_4$ at the beginning of each cycle, thus requiring no intervention of any external unit.

Figure 5:
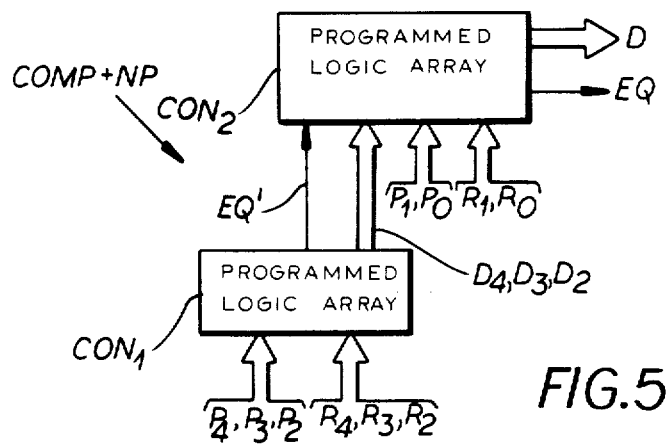
FIG. 5 schematically shows a logic network forming part of the device illustrated in FIG. 3.

In FIG. 5 we have shown a logic network incorporating the blocks COMP and NP of FIG. 3 in an integrated module. This network consists of two cascaded stages or levels $CON_1$ and $CON_2$. Stage $CON_1$, connected to wires $P_2$-$P_4$ and $R_2$-$R_4$ of buses P and R carrying the three most-significant bits of their respective codes p and r, generates the corresponding bits of new code d on wires $D_2$-$D_4$ of bus D extending to stage $CON_2$. The latter stage is also connected to the remaining wires $P_0$, $P_1$ and $R_0$, $R_1$ of buses P and R carrying the two least-significant bits. An equality signal EQ' emitted by stage $CON_1$, in the event of identity of the bits present on its two sets of incoming wires, gives rise to signal EQ in the output of stage $CON_2$ if the bits on wires $P_0$, $P_1$ also correspond to those of wires $R_0$, $R_1$. Bus D originates at stage $CON_2$.

We have found that, with a two-level logic network as shown in FIG. 2, the time required for processing two 5-bit words to check on their equality and to obtain the modified code d optimizes the ratio between the area of a chip occupied by the network and the propagation time of the various signals through the network, resulting in an area reduction by almost 1:7 in comparison with a one-level PLA structure.

We claim:

1. In a data-handling system with a multiplicity $n=2^m$ of components of different ranks served by a common data bus alternatively accessible by said components in an order of precedence based on their ranks, the combination therewith of a chain of n mutually identical arbitration devices respectively associated with and individually connected to said components, said arbitration devices being interlinked by a priority bus with m lines having a binary-tree structure including a first line connected to all n devices and an $m^{th}$ line divided into n/2 sections each connected to a pair of adjacent devices, said devices following one another in a predetermined ranking order of the associated components, each of said arbitration devices comprising:

register means for storing an m-bit priority code initially assigned to the respective device, the priority codes initially assigned to consecutive devices having numerical values varying progressively in conformity with said ranking order of the associated components;

normally blocked gating means inserted between said priority bus and an output circuit of said register means for transmitting the stored priority code to said priority bus in the presence of an access request from the associated component;

comparison means connected to said priority bus and to said output circuit for detecting an equality between the transmitted priority code and the state of energization of the lines of said priority bus in the presence of said access request, an arbitration device associated with a higher-ranking component modifying said state of energization by an overriding priority code simultaneously transmitted to the priority bus; and a control unit responsive to said access request for unblocking said gating means and sending a consent signal to the associated component in the presence of an equality determination by said comparison means, said consent signal enabling the associated component to access said data bus, each arbitration device further comprising calculating means having reference inputs connected to said priority bus inserted in series with a normally inactive driver in a loop between said output circuit and an input circuit of said register means for reloading same upon activation of said driver by a command from said control unit, said calculating means implementing the Boolean equation $$d_j = [\overline{d_{j+1}} * p_j] \, XOR \, r_j$$

where * stands for the AND function, XOR stands for the Exclusive-OR function, $p_j$ represents the binary state of energization of the $j^{th}$ line of said priority bus, $r_j$ is the logical value of the $j^{th}$ bit of the priority code stored in said register means, $d_j$ is the $j^{th}$ bit of a modified code elaborated by said calculating means, and j is an integer ranging from 1 through m, with $\overline{d_{j+1}} = 1$ for j'm, said calculating means enabling recurrent modification of the stored priority code by a periodic energization of said priority bus with a predetermined reference code.

2. The combination defined in claim 1 wherein said comparison means and said calculating means form part of a common logic network.

3. The combination defined in claim 2 wherein said logic network is divided into two cascaded stages making partial comparisons between bits read out from said register means and the state of energization of corresponding lines of said priority bus.

4. The combination defined in claim 1, further comprising timing means connected to the control units of all arbitration devices for establishing a succession of clock cycles, said reference code appearing on said priority bus at the beginning of any clock cycle.

5. The combination defined in claim 4, further comprising lockout means connected to all said control units for inhibiting the modification of the stored codes thereof by said calculating means in response to reception by any control unit of a prolongation signal from the associated component calling for an extension of a requested data-bus access over more than one clock cycle.

6. The combination defined in claim 5 wherein said lockout means comprises a normally energized conductor de-energized by an inhibition signal from any control unit.

7. The combination defined in claim 6 wherein said control units are programmed to terminate said inhibition signal one clock cycle prior to termination of a consent signal sent out in response to an access request accompanied by a prolongation signal.

8. The combination defined in claim 4 wherein said lines are wires connected to ground through respective resistors so as normally to carry a binary "0" overridable by voltage of binary value "1" applied thereto, said reference code being a binary "1" on said first line.

9. The combination defined in claim 1 wherein each arbitration device further comprises arithmetic means connected to said priority bus and normally open switch means inserted between said arithmetic means and said register means, the control units of said arbitration devices being connected in cascade by leads enabling sequential activation thereof in an initialization phase, the arithmetic means of a first arbitration device deriving an assigned priority code from a starting code represented by an initial state of energization of the priority bus and entering the derived priority code in the associated register means upon closure of said switch means by the control unit of said first device whereupon an unblocking of said gating means and emission of an activation signal to a second arbitration device supplies said priority bus with an altered state of energization serving as a starting code for the derivation of an assigned priority code by the arithmetic means of said second device, and so on to the last arbitration device in the chain.

10. The combiantion defined in claim 9 wherein said arithmetic means comprises a decrementer, said initial state of energization being zero for all lines of said priority but connected to said first arbitration device.

11. The combination defined in claim 1 wherein $m=5$.

* * * * *